United States Patent
Spatz et al.

(10) Patent No.: US 9,783,721 B2
(45) Date of Patent: Oct. 10, 2017

(54) LOW GWP HEAT TRANSFER COMPOSITIONS

(71) Applicant: HONEYWELL INTERNATIONAL INC., Morristown, NJ (US)

(72) Inventors: Mark W. Spatz, East Amherst, NY (US); Ankit Sethi, Tonawanda, NY (US); Samuel F. Yana Motta, East Amherst, NY (US); Elizabet Del Carmen Vera Becerra, Williamsville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 13/804,941

(22) Filed: Mar. 14, 2013

(65) Prior Publication Data
US 2014/0047860 A1    Feb. 20, 2014

Related U.S. Application Data

(60) Provisional application No. 61/684,924, filed on Aug. 20, 2012.

(51) Int. Cl.
*C09K 5/04*    (2006.01)
(52) U.S. Cl.
CPC ........ *C09K 5/045* (2013.01); *C09K 2205/106* (2013.01); *C09K 2205/126* (2013.01)
(58) Field of Classification Search
CPC .............. C09K 5/045; C09K 2205/106; C09K 2205/126
See application file for complete search history.

(56) References Cited

U.S. PATENT DOCUMENTS

| | | | |
|---|---|---|---|
| 8,024,937 B2 | 9/2011 | Minor | |
| 8,246,850 B2 | 8/2012 | Rached | |
| 8,252,198 B2 | 8/2012 | Rached | |
| 8,318,647 B2 | 11/2012 | Carr et al. | |
| 8,333,901 B2 | 12/2012 | Low | |
| 2006/0230770 A1* | 10/2006 | Kitsch | F25B 13/00 62/151 |

(Continued)

FOREIGN PATENT DOCUMENTS

| | | |
|---|---|---|
| WO | 2008009922 A2 | 1/2008 |
| WO | 2010002023 A1 | 1/2010 |

(Continued)

OTHER PUBLICATIONS

Downing, Ralph C., "Fluorocarbon Refrigerants Handbook," Chapter 3, Publ. Prentiss-Hall, Inc., 1988, pp. 17-43 US.

*Primary Examiner* — John Hardee
(74) *Attorney, Agent, or Firm* — Colleen D. Szuch

(57) ABSTRACT

The present invention relates, in part, to heat transfer compositions and methods that include (a) from about 65% to about 75% by weight of HFC-32; (b) from about 15% to about 35% by weight of a compound selected from unsaturated —CF3 terminated propenes, unsaturated —CF3 terminated butenes, and combinations of these; and (c) from greater than about 0% to less than about 10% by weight of $CO_2$, provided that the amount of component (c) is effective to improve heating capacity of the composition and reduce the defrost cycle in refrigerant applications, as compared to compositions lacking this component.

4 Claims, 3 Drawing Sheets

(56) References Cited

U.S. PATENT DOCUMENTS

| | | |
|---|---|---|
| 2006/0243944 A1* | 11/2006 | Minor et al. .................... 252/67 |
| 2009/0314015 A1 | 12/2009 | Minor et al. |
| 2010/0122545 A1 | 5/2010 | Minor et al. |
| 2010/0186432 A1 | 7/2010 | Perti et al. |
| 2010/0193155 A1 | 8/2010 | Nakatani et al. |
| 2011/0006248 A1 | 1/2011 | Van Horn et al. |
| 2011/0011123 A1 | 1/2011 | Matsuura et al. |
| 2011/0012052 A1 | 1/2011 | Van Horn et al. |
| 2011/0108756 A1 | 5/2011 | Tsuchiya et al. |
| 2011/0162410 A1* | 7/2011 | Low ................................ 62/532 |
| 2011/0186772 A1 | 8/2011 | Rached |
| 2011/0253927 A1 | 10/2011 | Minor et al. |
| 2012/0087822 A1 | 4/2012 | Nakano et al. |
| 2012/0104307 A1 | 5/2012 | Bogdan et al. |
| 2012/0119136 A1 | 5/2012 | Yana Motta et al. |
| 2012/0131947 A1 | 5/2012 | Nakano et al. |
| 2012/0132848 A1 | 5/2012 | Sawada et al. |
| 2012/0151958 A1 | 6/2012 | Rached |
| 2012/0153213 A1 | 6/2012 | Rached |
| 2012/0159982 A1 | 6/2012 | Rached |
| 2012/0161063 A1 | 6/2012 | Singh |
| 2012/0161064 A1 | 6/2012 | Rached |
| 2012/0167615 A1 | 7/2012 | Rached |
| 2012/0202904 A1 | 8/2012 | Chen et al. |
| 2012/0204586 A1 | 8/2012 | Kawabe et al. |
| 2012/0216551 A1 | 8/2012 | Minor et al. |
| 2012/0223269 A1 | 9/2012 | Van Horn et al. |
| 2012/0228541 A1 | 9/2012 | Takigawa et al. |
| 2012/0255316 A1 | 10/2012 | Andre et al. |
| 2012/0298909 A1 | 11/2012 | Low |
| 2012/0304687 A1 | 12/2012 | Sato et al. |
| 2013/0015395 A1 | 1/2013 | Yana Motta et al. |
| 2014/0222699 A1* | 8/2014 | Low ............................ 705/317 |

FOREIGN PATENT DOCUMENTS

| | | |
|---|---|---|
| WO | 2011101617 A2 | 8/2011 |
| WO | 2011101621 A2 | 8/2011 |
| WO | 2011141654 A2 | 11/2011 |
| WO | 2011141655 A2 | 11/2011 |
| WO | 2011141656 A2 | 11/2011 |
| WO | 2011161419 A1 | 12/2011 |
| WO | 2011163117 A1 | 12/2011 |
| WO | 2012069725 A1 | 5/2012 |
| WO | 2012110801 A1 | 8/2012 |
| WO | 2012151238 A2 | 11/2012 |

* cited by examiner

LOW GWP HEAT TRANSFER COMPOSITIONS

CROSS REFERENCES TO RELATED APPLICATIONS

The present application claims priority to U.S. Provisional Application Ser. No. 61/684,924, filed Aug. 20, 2012, the contents of which are incorporated herein by reference in its entirety.

FIELD OF THE INVENTION

This invention relates to compositions, methods and systems having utility particularly in refrigeration applications, and in particular aspects to heat transfer and/or refrigerant compositions useful in systems that typically utilize the refrigerant R-410A for heating and cooling applications.

BACKGROUND

Fluorocarbon based fluids have found widespread use in many commercial and industrial applications, including as the working fluid in systems such as air conditioning, heat pump and refrigeration systems, among other uses such as aerosol propellants, as blowing agents, and as gaseous dielectrics.

Heat transfer fluids, to be commercially viable, must satisfy certain very specific and in certain cases very stringent combinations of physical, chemical and economic properties. Moreover, there are many different types of heat transfer systems and heat transfer equipment, and in many cases it is important that the heat transfer fluid used in such systems posses a particular combination of properties that match the needs of the individual system. For example, systems based on the vapor compression cycle usually involve the phase change of the refrigerant from the liquid to the vapor phase through heat absorption at a relatively low pressure and compressing the vapor to a relatively elevated pressure, condensing the vapor to the liquid phase through heat removal at this relatively elevated pressure and temperature, and then reducing the pressure to start the cycle over again.

Certain fluorocarbons, for example, have been a preferred component in many heat exchange fluids, such as refrigerants, for many years in many applications. Fluoroalkanes, such as chlorofluoromethanes and chlorofluoroethanes, have gained widespread use as refrigerants in applications including air conditioning and heat pump applications owing to their unique combination of chemical and physical properties, such as heat capacity, flammability, stability under the conditions of operation, and miscibility with the lubricant (if any) used in the system. Moreover, many of the refrigerants commonly utilized in vapor compression systems are either single components fluids,or zeotropic, azeotropic mixtures.

Concern has increased in recent years about potential damage to the earth's atmosphere and climate, and certain chlorine-based compounds have been identified as particularly problematic in this regard. The use of chlorine-containing compositions (such as chlorofluorocarbons (CFCs), hydrochlorofluorocarbons (HCFCs) and the like) as refrigerants in air-conditioning and refrigeration systems has become disfavored because of the ozone-depleting properties associated with many of such compounds. There has thus been an increasing need for new fluorocarbon and hydrofluorocarbon compounds that offer alternatives for refrigeration and heat pump applications. By way of example, in certain aspects, it has become desirable to retrofit chlorine-containing refrigeration systems by replacing chlorine-containing refrigerants with non-chlorine-containing refrigerant compounds that will not deplete the ozone layer, such as hydrofluorocarbons (HFCs).

Another concern surrounding many existing refrigerants is the tendency of many such products to cause global warming. This characteristic is commonly measured as global warming potential (GWP). The GWP of a compound is a measure of the potential contribution to the green house effect of the chemical against a known reference molecule, namely, $CO_2$ which has a GWP=1. For example, the following known refrigerants possess the following Global Warming Potentials:

| REFRIGERANT | GWP |
| --- | --- |
| R410A | 2088 |
| R-507 | 3985 |
| R404A | 3922 |
| R407C | 1774 |

While each of the above-noted refrigerants has proven effective in many respects, these materials are become increasingly less preferred since it is frequently undesirable to use materials having GWPs greater than about 1000. A need exists, therefore, for substitutes for these and other existing refrigerants having undesirable GWPs.

There has thus been an increasing need for new fluorocarbon and hydrofluorocarbon compounds and compositions that are attractive alternatives to the compositions heretofore used in these and other applications. For example, it has become desirable to retrofit certain systems, including chlorine-containing and certain HFC-containing refrigeration systems by replacing the existing refrigerants with refrigerant compositions that will not deplete the ozone layer, will not cause unwanted levels of global warming, and at the same time will satisfy all of the other stringent requirements of such systems for the materials used as the heat transfer material.

With respect to performance properties, the present applicants have come to appreciate that that any potential substitute refrigerant must also possess those properties present in many of the most widely used fluids, such as excellent heat transfer properties, chemical stability, low- or no-toxicity, low or non-flammability and lubricant compatibility, among others.

With regard to efficiency in use, it is important to note that a loss in refrigerant thermodynamic performance or energy efficiency may have secondary environmental impacts through increased fossil fuel usage arising from an increased demand for electrical energy.

Furthermore, it is generally considered desirable for refrigerant substitutes to be effective without major engineering changes to conventional vapor compression technology currently used with existing refrigerants, such as CFC-containing refrigerants.

Flammability is another important property for many applications. That is, it is considered either important or essential in many applications, including particularly in heat transfer applications, to use compositions which are nonflammable or of relatively low flammability. As used herein, the term "nonflammable" refers to compounds or compositions which are determined to be nonflammable as determined in accordance with ASTM standard E-681, dated 2002, which is incorporated herein by reference. Unfortunately, many HFC's which might otherwise be desirable for used in refrigerant compositions are not flammable. For example, the fluoroalkane difluoroethane (HFC-152a) and the fluoroalkene 1,1,1-trifluorpropene (HFO-1243zf) are each flammable and therefore not viable for use alone in many applications.

Applicants have thus come to appreciate a need for compositions, and particularly heat transfer compositions, that are potentially useful in numerous applications, including vapor compression heating and cooling systems and methods, while avoiding one or more of the disadvantages noted above.

SUMMARY

In certain aspects, the present invention relates to compositions, methods, uses and systems which comprise or utilize a multi-component mixture comprising: (a) from about 65% to about 75% by weight of HFC-32; (b) from about 15% to about 35% by weight of a compound selected from unsaturated —CF3 terminated propenes, unsaturated —CF3 terminated butenes, and combinations of these; and (c) from greater than about 0% to less than about 10% by weight of CO2, provided that the amount of component (c) is effective to improve heating capacity of the composition and reduce the defrost cycle in refrigerant applications, as compared to compositions lacking this component, particularly compositions including component (a) and (b).

In alternative aspects, component (b) is provided in an amount from about 17% to about 35% by weight of a compound selected from unsaturated —CF3 terminated propenes, unsaturated —CF3 terminated butenes, and combinations of these; and component (c) is provided in an amount from greater than about 0% to about 8% by weight of CO2. In further aspects, component (b) is provided in an amount from about 19% to about 35% by weight of a compound selected from unsaturated —CF3 terminated propenes, unsaturated —CF3 terminated butenes, and combinations of these; and component (c) is provided in an amount from greater than about 0% to about 6% by weight of CO2. In even further aspects, component (b) is provided in an amount from about 20% to about 35% by weight of a compound selected from unsaturated —CF3 terminated propenes, unsaturated —CF3 terminated butenes, and combinations of these; and component (c) is provided in an amount from greater than about 0% to about 5% by weight of CO2.

In further aspects, the level of CO2 provided may be between, about 1% to about 8% by weight; from about 1% to about 6% by weight; from about 1% to about 5% by weight; from about 2% to about 8% by weight; from about 2% to about 6% by weight; or from about 2% to about 5% by weight.

In certain preferred embodiments, component (b) of the present invention comprises, consists essentially of, or consists of HFO-1234ze. The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans- forms of 1,1,1,3-tetrafluoropropene respectively. The term "HFO-1234ze" therefore includes within its scope cisHFO-1234ze, transHFO-1234ze, and all combinations and mixtures of these.

The present invention provides also methods and systems which utilize the compositions of the present invention, including methods and systems for transferring heat, and methods and systems for replacing an existing heat transfer fluid in an existing heat transfer system, and methods of selecting a heat transfer fluid in accordance with the present invention to replace one or more existing heat transfer fluids. While in certain embodiments the compositions, methods, and systems of the present invention can be used to replace any known heat transfer fluid, in further, and in some cases preferred embodiments, the compositions of the present application may be used as a replacement for R-410A.

Refrigeration systems contemplated in accordance with the present invention include, but are not limited to, automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, heat pump systems, and combinations of two or more of these. In certain preferred embodiments, the refrigeration systems include stationary refrigeration systems and heat pump systems or any system where R-410A is used as the refrigerant.

DETAILED DESCRIPTION OF PREFERRED EMBODIMENTS

Figure 1:
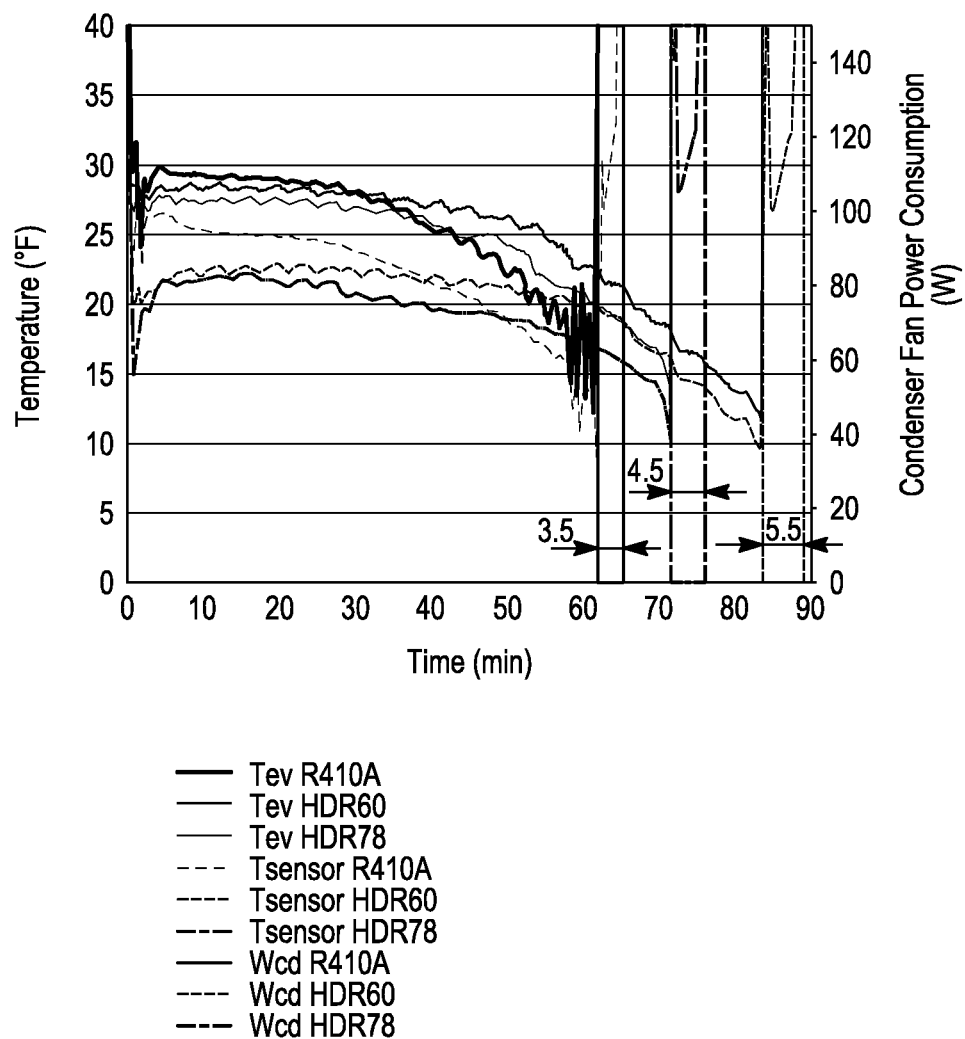
FIG. 1 illustrates evaporator average temperature, defrost coil temperature sensor, and condenser fan consumption for 1 cycle comparing R-410A with composition A (HDR-60) and composition B (HDR-78).

R-410A is commonly used in air conditioning systems, particularly stationary air conditioning units, and heat pump systems. It has an estimated Global Warming Potential (GWP) of 2088, which is much higher than is desired or required. Applicants have found that the compositions of the present invention satisfy in an exceptional and unexpected way the need for new compositions for such applications, particularly though not exclusively air conditioning and heat pump systems, having improved performance with respect to environmental impact while at the same time providing other important performance characteristics, such as capacity, efficiency, flammability and toxicity. In preferred embodiments the present compositions provide alternatives and/or replacements for refrigerants currently used in such applications, particularly and preferably R-410A, that at once have lower GWP values and have a close match in heating and cooling capacity to R-410A in such systems.

Heat Transfer Compositions

The compositions of the present invention are generally adaptable for use in heat transfer applications, that is, as a heating and/or cooling medium, but are particularly well adapted for use, as mentioned above, in AC and heat pump systems that have heretofor used R-410A.

Applicants have found that use of the components of the present invention within the stated ranges is important to achieve the important but difficult to achieve combinations of properties exhibited by the present compositions, particularly in the preferred systems and methods, and that use of these same components but substantially outside of the identified ranges can have a deleterious effect on one or more of the important properties of the compositions of the invention.

In certain embodiments, the HFC-32 is present in the compositions of the invention in an amount of from about 65 wt. % to about 75 wt. % by weight of the compositions.

In further embodiments, the compound selected from unsaturated —CF3 terminated propenes, unsaturated —CF3 terminated butenes, and combinations of these comprises HFO-1234ze, preferably where such compounds are present in the compositions in amounts of from about 15 wt. % to about 35 wt.% by weight. In further embodiments, this component is provided in an amount from about 17 wt. % to about 35 wt.% by weight; from about 19 wt. % to about 35 wt.% by weight; or from about 20 wt. % to about 35 wt.% by weight. In certain embodiments, the second component consists essentially of, or consists of, HFO-1234ze.

In even further embodiments, the compositions of the invention include CO2 in an amount from greater than about 0 wt. % to less than about 10 wt. %. In further embodiments, CO2 is provided in an amount from greater than about 0 wt. % to about 8 wt. %, or from greater than about 0 wt. % to about 6 wt. %. In certain preferred embodiments, CO2 is provided in an amount from greater than 0 wt. % to about 5%. In further embodiments, CO2 may be between, about 1% to about 8% by weight of CO2; from about 1% to about 6% by weight of CO2; from about 1% to about 5% by weight of CO2; from about 2% to about 8% by weight of CO2; from about 2% to about 6% by weight of CO2; or from about 2% to about 5% by weight of CO2.

In certain aspects of the invention, Applicants have found that the inclusion of CO2 in the compositions of the present invention, while increasing glide, results in surprisingly and unexpected improvement in composition capacity, particularly in heating mode, and system defrost. Glide refers to the difference between the starting and ending temperatures of a phase-change process by a refrigerant within a refrigerating system, and defrost refers to the removal of ice and frost accumulated on the refrigerant system during the course of a refrigeration cycle. An increase in glide typically forces the system to work at lower suction pressures, which results in a decrease in performance and also increases cycle time and energy spent on system defrost. Applicants demonstrate herein, however, that the addition of CO2 to compositions include HFO-1234 and HFC-32, while increasing glide, surprisingly and unexpectedly improves system capacity, particularly in the heating mode. It is also demonstrated herein to surprisingly and unexpectedly decrease the cycle time and energy required for system defrost.

Applicants have also found that the compositions of the present invention are capable of achieving a difficult combination of properties, including low GWP. By way of non-limiting example, the following Table A illustrates the substantial GWP superiority of certain compositions of the present invention, which are described in parenthesis in terms of weight fraction of each component, in comparison to the GWP of R-410A, which has a GWP of 2088.

TABLE A

| Name | Composition | GWP | GWP % R410A |
|------|-------------|-----|-------------|
| A | R32/1234ze(E)(0.73/0.27) | 494 | 23.6% |
| B | R32/1234ze(E)/CO2(0.73/0.24/0.03) | 494 | 23.6% |

The compositions of the present invention may include other components for the purpose of enhancing or providing certain functionality to the composition, or in some cases to reduce the cost of the composition. For example, refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent.

Commonly used refrigeration lubricants such as Polyol Esters (POEs) and Poly Alkylene Glycols (PAGs), PAG oils, silicone oil, mineral oil, alkyl benzenes (ABs) and poly (alpha-olefin) (PAO) that are used in refrigeration machinery with hydro fluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils have sufficient solubility with the refrigerant that is comprised of an iodocarbon, wherein the combination of the iodocarbon and the hydrocarbon oil are more stable than other types of lubricant. Such combinations are therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. Generally speaking, such refrigeration systems contemplated in accordance with the present invention include, but are not limited to, automotive air conditioning systems, residential air conditioning systems, commercial air conditioning systems, residential refrigerator systems, residential freezer systems, commercial refrigeration systems, small refrigeration systems, commercial freezer systems, chiller air conditioning systems, chiller refrigeration systems, heat pump systems, and combinations of two or more of these.

In certain preferred embodiments, the compositions of the present invention are used in refrigeration systems originally designed for use with an HCFC refrigerant, such as, for example, R-410A. Such refrigeration systems may include, but are not limited to, commercial refrigeration systems, small refrigeration systems, stationary refrigeration systems and heat pump systems or any system where R-410A is used as the refrigerant.

The preferred compositions of the present invention tend to exhibit many of the desirable characteristics of R-410A but have a GWP that is substantially lower than that of R-410A while at the same time having a capacity that is substantially similar to or substantially matches, and preferably is as high as or higher than R-410A. In particular, applicants have recognized that certain preferred embodiments of the present compositions tend to exhibit relatively low global warming potentials ("GWPs"), preferably less than about 1000, preferably not greater than 500, more preferably not greater than about 400, and even more preferably not greater than about 350.

As mentioned above, the present invention achieves exceptional advantages in connection with commercial refrigeration systems, and in certain preferred aspects stationary refrigeration systems. Non-limiting examples of such stationary refrigeration systems are provided in Examples 4 and 5, below. To this end, such systems may include low temperature commercial applications (Example 5), including commercial freezers or systems that may be used for the storage and maintenance of frozen goods. They may also include medium-temperature commercial application (Example 4), such as commercial refrigerators, including systems for the storage of fresh goods. The examples below provide typical conditions and parameters that are used for such applications. These conditions, however, are not considered limiting to the invention, as one of skill in the art will appreciate that they may be varied based on one or more of a myriad of factors, including but not limited to, ambient conditions, intended application, time of year, and the like. Such examples are also not necessarily limiting to the definition of the term "stationary refrigeration" or "commercial refrigeration." The compositions provided herein may be used in similar type systems or, in certain embodiments, in any alternative system where R-410A is or may be adapted for use as a refrigerant.

In certain other preferred embodiments, the refrigeration compositions of the present invention may be used in refrigeration systems containing a lubricant used conventionally with R-410A, such as polyolester oils, and the like, or may be used with other lubricants traditionally used with HFC refrigerants, as discussed in greater detail above. As used herein the term "refrigeration system" refers generally to any system or apparatus, or any part or portion of such a system or apparatus, which employs a refrigerant to provide heating or cooling. Such air refrigeration systems include, for example, air conditioners, electric refrigerators, chillers, or any of the systems identified herein or otherwise known in the art.

EXAMPLES

The following examples are provided for the purpose of illustrating the present invention but without limiting the scope thereof.

Example 1

Performance

A representative air-to-air reversible heat pump designed for R410A was tested. This ducted unit was tested in Honeywell's Buffalo, N.Y. application laboratory. The ducted unit is a 3-ton (10.5 kW cooling capacity) 13 SEER (3.8 cooling seasonal performance factor, SPF) with a heating capacity of 10.1 kW and an HSPF of 8.5 (rated heating SPF of ~2.5), equipped with a scroll compressor. This system has tube-and-fin heat exchangers, reversing valves and thermostatic expansion valves for each operating mode. Due to the different pressures and densities of the refrigerants tested, some of the tests required the use of Electronic Expansion Valves (EEV) to reproduce the same degrees of superheat observed with the original refrigerants.

Tests shown in table 2 were performed using standard [AHRI, 2008] operating condition in table 1. All tests were performed inside environmental chambers equipped with instrumentation to measure both air-side and refrigerant-side parameters. Refrigerant flow was measured using a coriolis flow meter while air flow and capacity was measured using an air-enthalpy tunnel designed according to industry standards [ASHRAE, 1992]. All primary measurement sensors were calibrated to ±0.25° C. for temperatures and ±0.25 psi for pressure. Experimental uncertainties for capacity and efficiency were on average ±5%. Capacity values represent the air-side measurements, which were carefully calibrated using the reference fluid (R-410A). Both developmental blends composition A (73% R32/24%1234ze(E)/3% CO2) and composition B (73% R32/27% 1234ze(E)) were tested in both cooling and heating modes along with the baseline refrigerant R-410A.

TABLE 1

Operating Conditions

| Test Condition | Indoor Ambient DB(° C.) | Indoor Ambient WB(° C.) | Outdoor Ambient DB(° C.) | Outdoor Ambient WB(° C.) |
|---|---|---|---|---|
| Operating Conditions (Cooling Mode) | | | | |
| AHRI Std. A | 80 | 67 | 95 | 75 |
| AHRI Std. B | 80 | 67 | 82 | 65 |
| AHRI Std. C | 80 | 57 | 82 | 65 |
| AHRI Std. MOC | 80 | 67 | 115 | 75 |
| Operating Conditions (Heating Mode) | | | | |
| AHRI Std. H1 | 70 | 60 | 47 | 43 |
| AHRI Std. H2 | 70 | 60 | 35 | 33 |
| AHRI Std. H3 | 70 | 60 | 17 | 15 |

Note
MOC → maximum operating condition

A. Cooling Mode

Table 2 shows performance results in cooling mode. For a quasi drop-in test, composition A shows efficiency comparable to R410A with capacities of 96%. The second blend (compositin B) has a higher evaporator glide but still matches capacity and efficiency of R410A (differences lie within the experimental uncertainty of +/−3%).

B. Heating Mode

Table 2 also shows performance results in heating mode. When evaluated at the low temperature, composition A shows lower capacity comparable to R410A with slightly higher efficiency. This is mainly to the glide which forces the system to work at lower suction pressures. This in general a typical outcome of using a blend with glide: the larger the glide the worse the performance, especially in heating mode. Further testing of the higher glide composition B shows improved performance and comparable to R410A. This is unexpected because the increase in glide from composition A to composition B would be expected to result in a decrease of performance, again, because it should force the system to work at a lower suction pressure. As evident from Table 2, however, composition B surprisingly demonstrates an increase in heating capacity over composition A, with the addition of $CO_2$.

TABLE 2

Cooling and Heating Mode Tests Results

| Fluid | Glide Ev (° F.) | Cooling Cap. @ 95° F. Amb (AHRI A) | Cooling Eff. @ 82° F. Amb (AHRI B) | Heating Std. Rating (AHRI H1) Heating (47° F./70° F.) Capacity | Heating Std. Rating (AHRI H1) Heating (47° F./70° F.) Eff | Heating Low Temp. (AHRI H3) Heating (17° F./70° F.) Capacity | Heating Low Temp. (AHRI H3) Heating (17° F./70° F.) Eff |
|---|---|---|---|---|---|---|---|
| R410A | 0.1 | 100% | 100% | 100% | 100% | 100% | 100% |
| A | 4.0 | 96% | 103% | 97% | 104% | 95% | 101% |
| B | 9.0 | 98% | 99% | 98% | 100% | 99% | 100% |

Example 2

Heating Mode Frost Formation Test AHRI Std. H2 Condition

The test AHRI Std. H2 as per the standard, requires to take into account the defrost cycle. This defrost cycle is manufacturer dependent. For the example the defrost initiates if the coil sensor temperature is below 35 F for more than 34 min and the difference between the coil sensor temperature and the air sensor temperature is below a certain threshold. The defrost ends when the coil sensor temperature exceeds 70 F. Manufacturer settings were maintained for the tests with the 3 blends tests. Results from table 3 and graphic 1 show that a blend with higher glide (composition A) tends to have longer defrost cycles (157% of 410A). To this end, testing of the higher glide blend (composition B) was expected to produce a longer defrost cycle than that of composition A. As demonstrated below, however, the opposite was surprisingly and unexpectedly obtained and the defrost cycle for composition B was shorter than composition A.

TABLE 3

Defrost Cycle

| Process/Time | R410A | Composition A | Composition B |
|---|---|---|---|
| Defrost Cycle Time (% of R410A) | 3.5 min (100%) | 157% | 129% |
| Glide (° F.) | 0.1 | 4.0 | 9.0 |

Example 3

Analysis of Varying Amounts of $CO_2$

The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R.C. Downing, FLUOROCARBON REFRIGERANTS HANDBOOK, Chapter 3, Prentice-Hall, 1988).

Below, an example heat pump system is provided working in cooling mode, the condenser temperature is set to 47.2° C., which generally corresponds to an outdoor temperature of about 35° C. The degree of sub-cooling at the expansion device inlet is set to 5.55° C. The evaporating temperature is set to 10.6° C., which corresponds to a Indoor ambient temperature of about 20° C. The degree of superheat at evaporator outlet is set to 5.55° C. Compressor efficiency is set to 70%, and the volumetric efficiency is set to 95%. The pressure drop and heat transfer in the connecting lines (suction and liquid lines) are considered negligible, and heat leakage through the compressor shell is ignored. Several operating parameters are determined for the compositions identified in Table A above in accordance with the present invention, and these operating parameters are reported below, based upon R410A having a COP value of 1.00 and a capacity value of 1.00.

Figure 2:
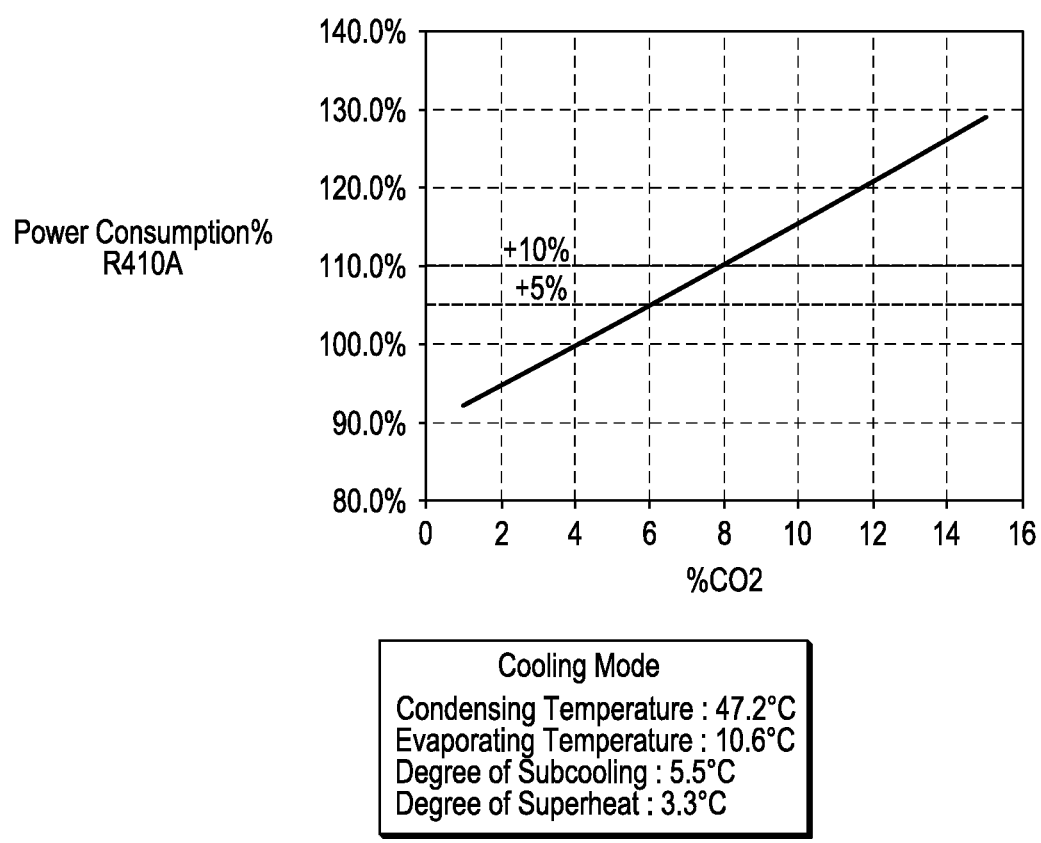
FIG. 2 provides a graphic illustration of comparing power consumption (as a percentage of R-410A) with varying percentages of CO2 provided in a refrigerant composition in a cooling mode.
Figure 3:
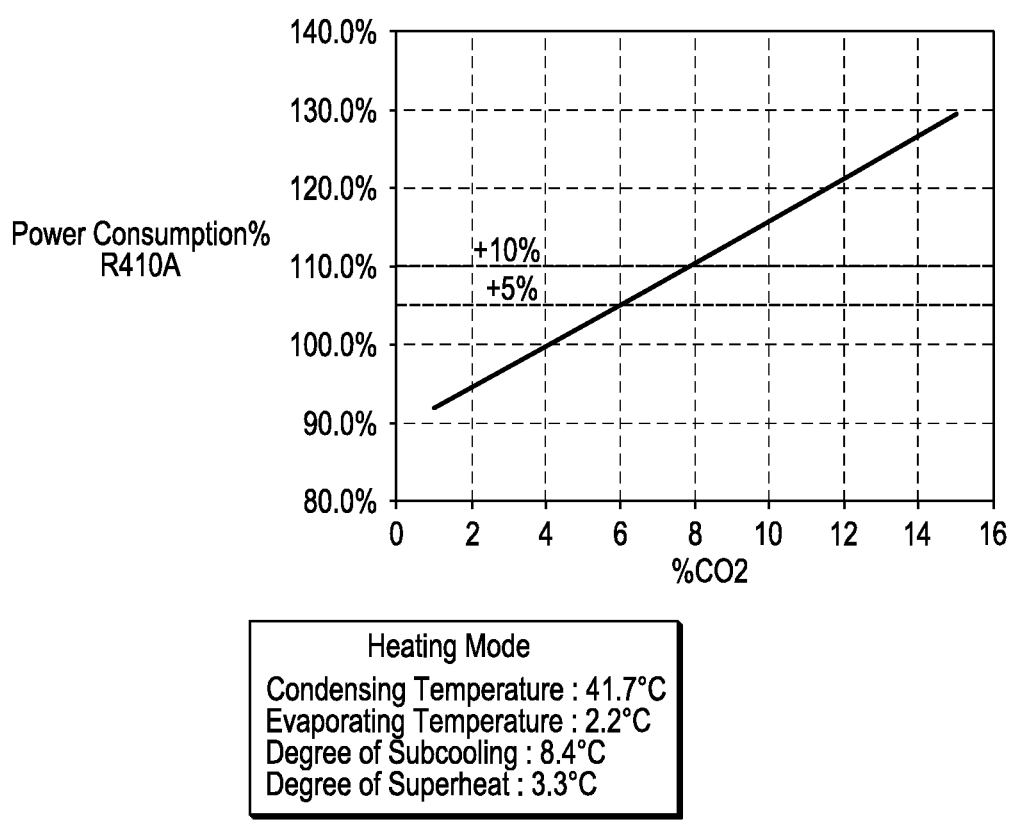
FIG. 3 provides a graphic illustration of comparing power consumption (as a percentage of R-410A) with varying percentages of CO2 provided in a refrigerant composition in a heating mode.

For the same system working in heating, the condenser temperature is set to 41.7° C., which generally corresponds to an indoor temperature of about 21.1° C. The degree of sub-cooling at the expansion device inlet is set to 8.4° C. The evaporating temperature is set to 2.2° C., which corresponds to a outdoor ambient temperature of about 8.3° C. The degree of superheat at evaporator outlet is set to 3.33° C. Compressor isentropic efficiency is set to 70%, and the volumetric efficiency is set to 95%. The pressure drop and in Tables 4 and 5 and FIGS. 2 and 3, which are based upon R-410A having a COP value of 1.00 and a capacity of 1.00.

In certain preferred embodiments the replacement should not require substantial redesign of the system and no major item of equipment needs to be replaced in order to accommodate the refrigerant of the present invention. For that purpose the replacement preferably fulfills one or more of, and preferably all, of the following requirements:

Cooling capacity that is within +115% (preferably 110%) and 95% of the cooling capacity of the same system using R-410A. This parameter is potentially important in certain embodiments because it can help to ensure adequate cooling of the product being refrigerated. It should also be noted that excess capacity can cause overload of the electric motor therefore they should be also avoided.

Efficiency (COP) that is similar to R-410A (±5%) without incurring in excess capacity as noted above.

Power consumption (COP) is +110% of R-410A (preferably +110%) to avoid overcharge of the electric motor.

TABLE 4

Cooling Mode

| % R32 | % R1234ze | % $CO_2$ | Evaporator Glide (° C.) | $T_{Dish.}$-$T_{Dish.,R410A}$ (° C.) | Cooling Capacity (kW) | Power (kW) | Cooling COP |
|---|---|---|---|---|---|---|---|
| 73 | 26 | 1 | 4.1 | 11.2 | 95.0% | 92.3% | 102.9% |
| 73 | 24 | 3 | 4.9 | 12.7 | 99.4% | 97.4% | 102.0% |
| 73 | 22 | 5 | 5.7 | 14.1 | 103.8% | 102.5% | 101.3% |
| 73 | 20 | 7 | 6.3 | 15.3 | 108.3% | 107.7% | 100.5% |
| 73 | 18 | 9 | 6.8 | 16.5 | 112.7% | 112.9% | 99.8% |
| 73 | 16 | 11 | 7.3 | 17.6 | 117.1% | 118.2% | 99.1% |
| 73 | 14 | 13 | 7.7 | 18.6 | 121.5% | 123.5% | 98.4% |
| 73 | 12 | 15 | 8.0 | 19.4 | 125.9% | 128.8% | 97.7% |

TABLE 5

Heating Mode

| % R32 | % R1234ze | % $CO_2$ | Evaporator Glide (° C.) | $T_{Dish.}$-$T_{Dish.,R410A}$ (° C.) | Heating Capacity (kW) | Power (kW) | Heating COP |
|---|---|---|---|---|---|---|---|
| 73 | 26 | 1 | 4.3 | 12.7 | 93.1% | 92.0% | 101.2% |
| 73 | 24 | 3 | 5.2 | 14.4 | 97.9% | 97.2% | 100.7% |
| 73 | 22 | 5 | 6.0 | 15.9 | 102.6% | 102.4% | 100.2% |
| 73 | 20 | 7 | 6.7 | 17.3 | 107.5% | 107.7% | 99.8% |
| 73 | 18 | 9 | 7.3 | 18.6 | 112.3% | 113.0% | 99.3% |
| 73 | 16 | 11 | 7.8 | 19.8 | 117.1% | 118.4% | 98.9% |
| 73 | 14 | 13 | 8.2 | 20.9 | 122.0% | 123.9% | 98.5% |
| 73 | 12 | 15 | 8.6 | 21.9 | 126.9% | 129.4% | 98.0% | heat transfer in the connecting lines (suction and liquid lines) are considered negligible, and heat leakage through the compressor shell is ignored. Several operating parameters are determined for the compositions identified in Table A above in accordance with the present invention, and these operating parameters are reported below, based upon R410A having a COP value of 1.00 and a capacity value of 1.00.

In accordance with the above conditions heating and cooling performance of the compositions were calculated using varying amounts of CO2. In a first composition, CO2 was provided at 1% and was increased, successively, by 2% in other compositions up until a total of 15%. Several operating parameters are determined and are reported below As can be seen above, assuming a use limit of 110% power consumption relative to R410A, the threshold for CO2 is about 8%. Assuming a use limit of 5% (which may be desirable in warm climates), a limit of CO2 is about 6%.

Example 4

Performance in Stationary Refrigeration (Commercial Refrigeration)—Medium Temperature Applications The performance of some preferred compositions were evaluated against other refrigerant compositions at conditions typical of medium temperature refrigeration. This application covers the refrigeration of fresh food. The conditions at which the compositions were evaluated are shown in Table 6:

TABLE 6

| | |
|---|---|
| Evaporating Temperature | 20° F. (−6.7° C.) |
| Condensing Temperature | 110° F. (43.3° C.) |
| Evaporator Superheat | 10° F. (5.5° C.) |
| Condenser Subcooling | 9° F. (5° C.) |
| Compressor Displacement | 1.0 ft³/min (0.028 m³/min) |
| Compressor Isentropic Eff. | 65% |
| Compressor Return Temp | 45° F. (7.2° C.) |

Table 7 compares compositions of interest to the baseline refrigerant, R-410A, in a typical medium temperature application.

TABLE 7

| Name | Capacity | Efficiency | Suction Pressure | Discharge Press. | Diff Dis. Temp. ° C. | Rel-Flow | Degree of Superheat, ° C. |
|---|---|---|---|---|---|---|---|
| A | 92% | 104% | 84% | 88% | 17 | 69% | −1.6 |
| B | 99% | 102% | 91% | 95% | 20 | 72% | −0.1 |

As can be seen, the compositions show higher efficiency than the baseline refrigerant, R-410A and within 10% of the capacity.

Example 5

Performance in Stationary Refrigeration (Commercial Refrigeration)—Low Temperature Applications The performance of some preferred compositions were evaluated against other refrigerant compositions at conditions typical of low temperature refrigeration. This application covers the refrigeration of frozen food. The conditions at which the compositions were evaluated are shown in Table 8:

TABLE 8

| | |
|---|---|
| Evaporating Temperature | −15° F. (−26.1° C.) |
| Condensing Temperature | 110° F. (43.3° C.) |
| Evaporator Superheat | 10° F. (5.5° C.) |
| Condenser Subcooling | 9° F. (5° C.) |
| Compressor Displacement | 1.0 ft³/min (0.028 m³/min) |
| Compressor Isentropic Eff. | 65% |
| Compressor Return Temp | 30° F. (−1.1° C.) |

Table 9 compares compositions of interest to the baseline refrigerant, R-410A in typical low temperature application.

TABLE 9

| Name | Capacity | Efficiency | Suction Pressure | Discharge Press. | Diff Dis. Temp. ° C. | Rel-Flow | Degree of Superheat, ° C. |
|---|---|---|---|---|---|---|---|
| A | 92% | 105% | 82% | 88% | 26 | 68% | −1.3 |
| B | 99% | 104% | 89% | 95% | 31 | 71% | 0.0 |

As can be seen, the compositions are within 5% of the efficiency of the baseline refrigerant, R-22 and within 5% of the capacity.

What is claimed is:

1. A heat transfer system comprising a heat pump comprising a compressor, a condenser, an evaporator and a reversible valve and a heat transfer composition in said system, said heat transfer composition comprising:
   (a) from about 65% to about 75% by weight of HFC-32;
   (b) from about 20% to about 35% by weight of 1,3,3,3-tetrafluoropropene (HFO-1234ze), wherein said HFO-1234ze in said composition consists essentially of about 100% by weight of trans-1,3,3,3-tetrafluoropropene (HFO-1234ze(E)) based on the total weight of HFO-1234ze in the composition; and
   (c) from about 1% to 3% by weight of CO2, wherein said system has a cooling and heating capacity of from about 95% to 100% +/− 3% measured relative to R-410A in said system and a reduced defrost cycle in as compared to compositions lacking component (c).

2. The heat transfer system of claim 1 wherein said heat transfer composition comprises 3% by weight of CO2.

3. A method of replacing an existing heat transfer fluid contained in heat transfer system comprising a heat pump comprising a compressor, a condenser, an evaporator and a reversible valve, said method comprising removing at least a portion of said existing heat transfer fluid from said system, said existing heat transfer fluid being HFC-410A and replacing at least a portion of said existing heat transfer fluid by introducing into said system a heat transfer composition comprising:
   (a) from about 65% to about 75% by weight of HFC-32;
   (b) from about 20% to about 35% by weight of 1,3,3,3-tetrafluoropropene (HFO-1234ze), wherein said HFO-1234ze in said composition consists essentially of about 100% by weight of trans-1,3,3,3-tetrafluoropropene (HFO-1234ze(E)) based on the total weight of HFO-1234ze in the composition ; and
   (c) from about 1% to 3% by weight of CO2, wherein said system has a cooling and heating capacity of from about 95% to 100% +/− 3% measured relative to R-410A in said system and a reduced defrost cycle in as compared to compositions lacking component (c).

4. The heat transfer system of claim 1 wherein said heat transfer composition has a GWP of not greater than 500.

* * * * *